H. E. TOWNSEND.
DUPLEX SEALING MACHINE.
APPLICATION FILED FEB. 21, 1918.

1,406,703.

Patented Feb. 14, 1922.
4 SHEETS—SHEET 1.

INVENTOR
Harry E. Townsend
BY
Ramsey & Parmelee
ATTORNEY

H. E. TOWNSEND.
DUPLEX SEALING MACHINE.
APPLICATION FILED FEB. 21, 1918.

1,406,703.

Patented Feb. 14, 1922.

INVENTOR
Harry E. Townsend
BY
Ramsey & Parmelee
ATTORNEYS

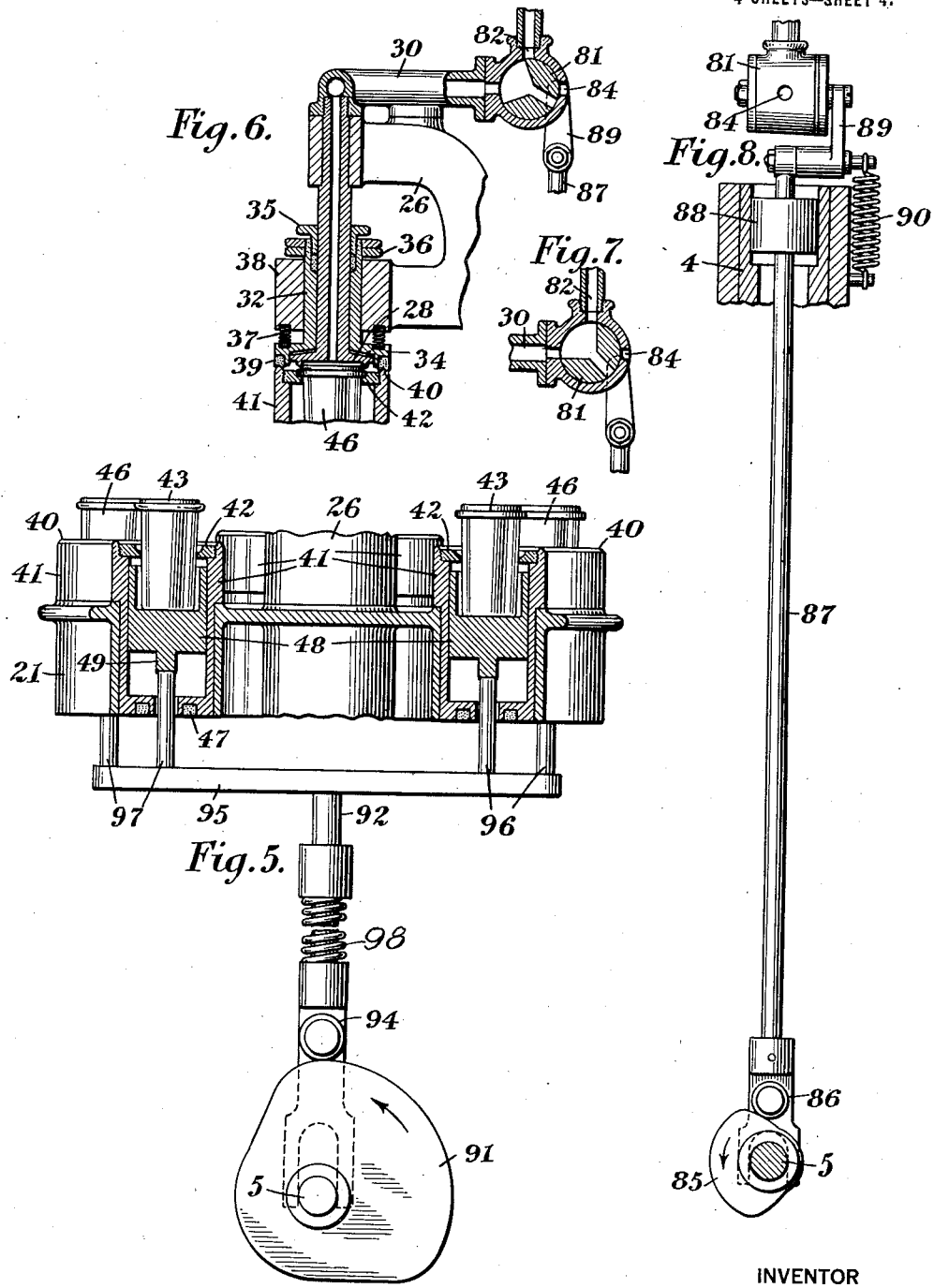

UNITED STATES PATENT OFFICE.

HARRY E. TOWNSEND, OF BROOKLYN, NEW YORK, ASSIGNOR TO ANCHOR CAP & CLOSURE CORPORATION, OF BROOKLYN, NEW YORK, A CORPORATION OF NEW YORK.

DUPLEX SEALING MACHINE.

1,406,703. Specification of Letters Patent. Patented Feb. 14, 1922.

Application filed February 21, 1918. Serial No. 218,469.

*To all whom it may concern:*

Be it known that I, HARRY E. TOWNSEND, a citizen of the United States, residing at Brooklyn, in the county of Kings, State of New York, have invented certain new and useful Improvements in Duplex Sealing Machines, of which the following is a specification.

This invention relates broadly to bottle and jar sealing apparatus, and more particularly to a machine for effecting the seal under vacuum.

The principal object of the present invention is a machine for simultaneously exhausting and sealing a plurality of packages by individual sealing mechanism for each package.

Another object of the present invention is a machine of the character specified comprising mechanism for effecting the loading, sealing and unloading operations of a plurality of individual packages by substantially simultaneously operated mechanisms.

A further object of the present invention is a machine of the character specified, comprising a machine frame and a rotating pocket carrying table mounted to rotate around the vertical axis of the main machine frame, with a sealing head mounted above said table, and table operating devices connected directly to the table.

A still further object of the present invention is an apparatus of the character specified, wherein the pockets are arranged in groups on said table with the several groups subtending a definite angle, and wherein the stations for loading, and unloading, subtend angles equal to that of two groups.

A further and important object of the present invention is a table provided with pockets adapted to carry a sealing chuck, which pockets are constructed to move relatively to said table to bring sealing chucks into operative relation with sealing dies whereby a cap on a suitable receptacle within the chuck will be deformed to form a side seal between the cap and the receptacle.

A still further object of the present invention comprises a movable pocket of the character specified wherein the pocket engages a yielding, closing cover which forms a hermetic seal with the cup prior to the sealing operation on the cap within the chuck.

A still further and important object of the present invention is a pocket of the character specified wherein the air is exhausted from the pocket and the container therein as soon as a hermetic seal is effected between the cover and the pocket and prior to the deforming of the cap to form the side seal.

A still further object of the present invention is a machine of the character specified wherein the package is yieldingly raised into engagement with the sealing die prior to the deforming operation on the cap, and which yielding pressure is continued through the deforming operation in which the cap is sealed in the receptacle.

Other and further objects of the present invention will in part be obvious and will in part be pointed out hereinafter in the specification following by reference to the accompanying drawings wherein like parts are represented by like characters throughout the several figures thereof.

Figure 5 is a sectional detail view taken on line 5—5 Figure 3.

Figure 6 is a detail view of the air valve and sealing mechanism.

Figure 7 is a detail view illustrating the air valve turned to permit the exhaustion of the air from the sealing chamber and connections.

Figure 8 is a detail view of the operating mechanism for the air valve.

Figure 9 illustrates the sealing chuck and die prior to the deforming operation on the cap.

Figure 10 illustrates the same parts as Figure 9 with the deforming or sealing operation on the cap completed.

Figure 1:
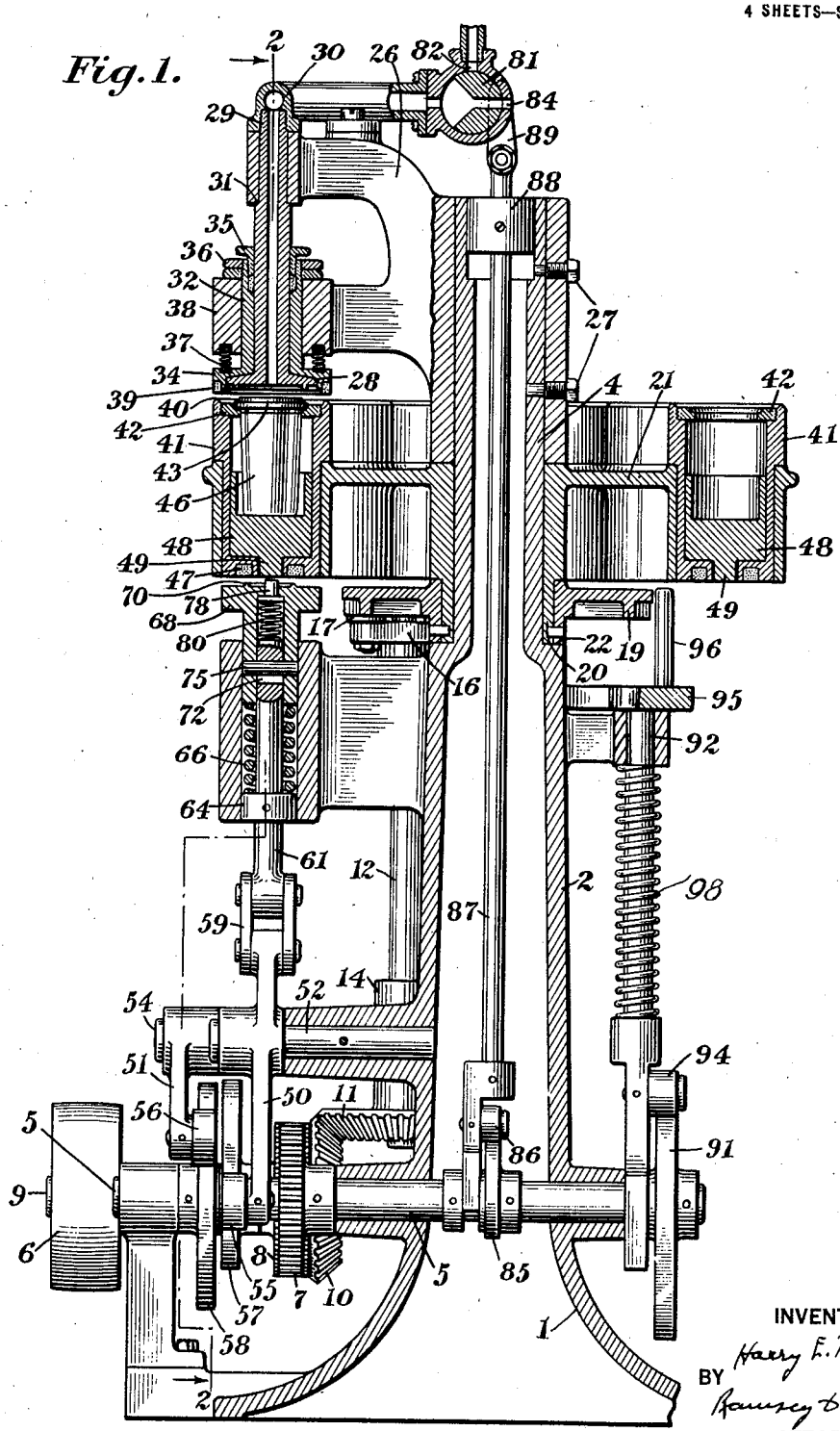
Figure 1 is an elevational view showing a section through the machine on substantially line 1—1 of Figure 3.

Sealing machines of the character of the present invention are usually placed in more or less limited space and have heretofore in the art comprised either a single pocket or chamber in which the sealing took place, or a very small revolving head carrying relatively few pockets very closely positioned, in order that the machine would only take up a minimum amount of floor space.

In single pocket machines obviously the processes of loading, sealing, and unloading, must comprise a series of operations. In the small rotating head type of machines it is possible to unload the pockets, and load the pockets, while the sealing operation is taking place. In such machines, however, the same pockets are unloaded and loaded, so therefore, this comprises a series of operations.

The present machine contemplates a construction wherein the pocket table is greatly increased in size over any known machine and revolves on the vertical axis of the machine frame so that a minimum amount of space per machine is utilized. The increased size of the pocket table permits the simultaneous loading, sealing, and unloading of the entire machine so that the speed of the machine is greatly increased. To further increase the speed of the machine it is constructed to operate in multiple so that a plurality of packages are loaded into the machine, a plurality of packages are sealed, and a plurality of packages are unloaded from the machine, the loading, sealing and unloading all being carried out simultaneously, or at least nearly so. In order to facilitate adjustment, which is often required for individual chucks and dies, each package is sealed by a separate mechanism. This mechanism includes separate plungers and separate chucks and dies.

More especially a preferred embodiment of the present invention comprises a main machine frame with a vertical pedestal extending upwardly from a suitable base and having the power shaft mounted adjacent the base with the pocket carrying table journaled directly upon the upper end of the vertical pedestal, and an operating mechanism for turning and positioning the table, comprising a stop cam in the nature of a Geneva movement which is directly geared to the main drive shaft. A die carrying head is mounted on the upper end of the pedestal above the rotating table and carries a pair of sealing dies rigidly secured to the head and operatively connected with a pipe line connected to suitable air exhausting mechanism. A control valve is mounted in the pipe line and actuated by a time cam mounted on the main power shaft. The main power shaft also carries a pair of large sealing cams which, through suitable link mechanism, operate a pair of plungers which are adapted to lift the receptacle pockets, on the pocket table, that are directly beneath the stationary sealing dies carried by the head so that any cap resting in the chuck in the top of the pockets will be brought into engagement with the sealing dies and deformed to make a side seal against the receptacle on which the cap rests. The main shaft also carries another cam which lifts a plate carrying a pair of ejector posts that raise the receptacle bases which slide within the pockets and thus lift the capped ends of the receptacles sufficiently above the pockets so that receptacles can easily be placed within or lifted from the pockets. Preferably the several cams are so timed that the sealing operations and the lifting of the receptacle bases are substantially simultaneous so that while the sealing operation is going on the machine may be simultaneously therewith both loaded and unloaded.

A more detailed description of the machine will be given by reference to the drawings.

Figure 2:
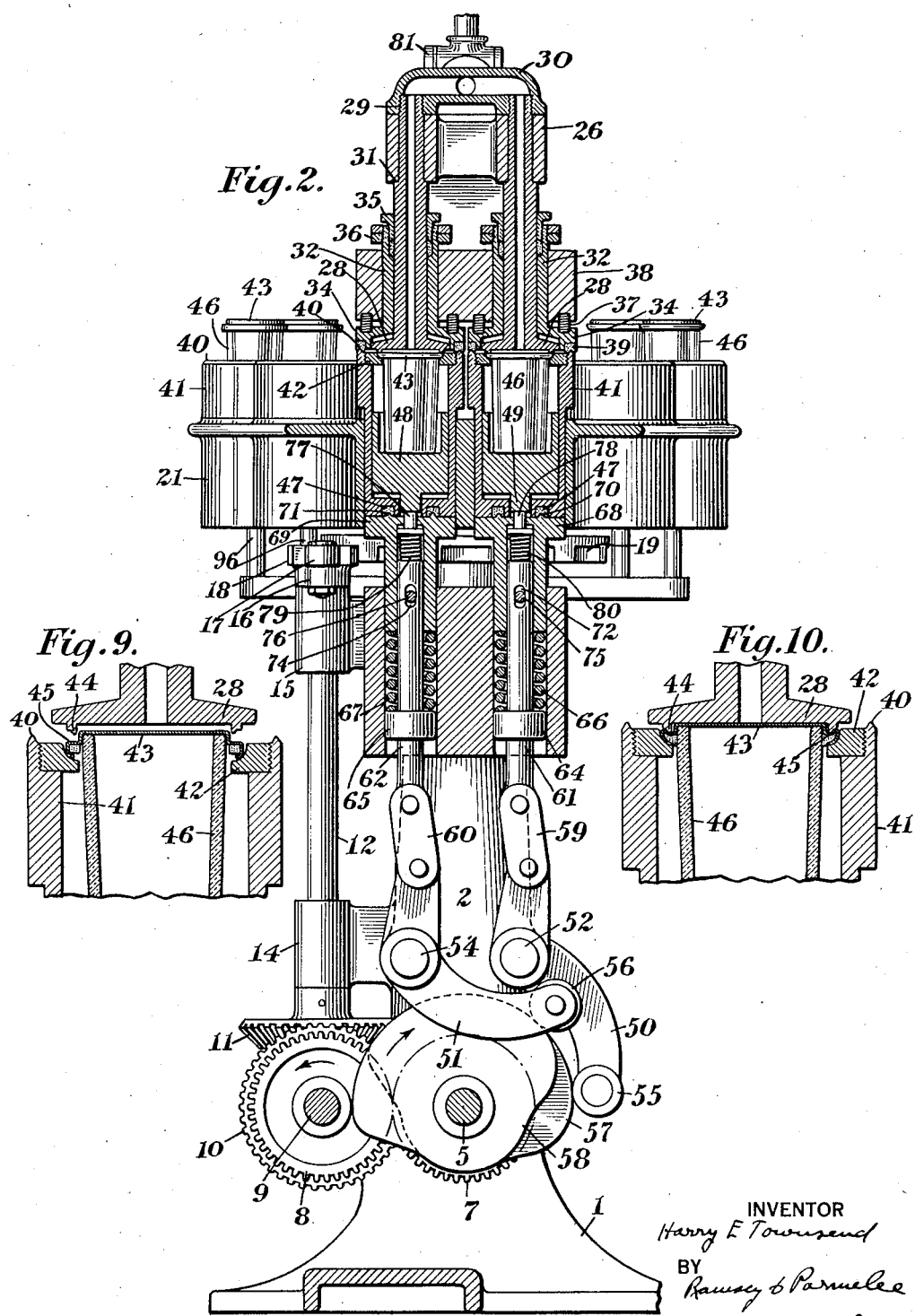
Figure 2 is an elevational view showing a section of the machine on line 2—2 Figure 1.
Figure 3:
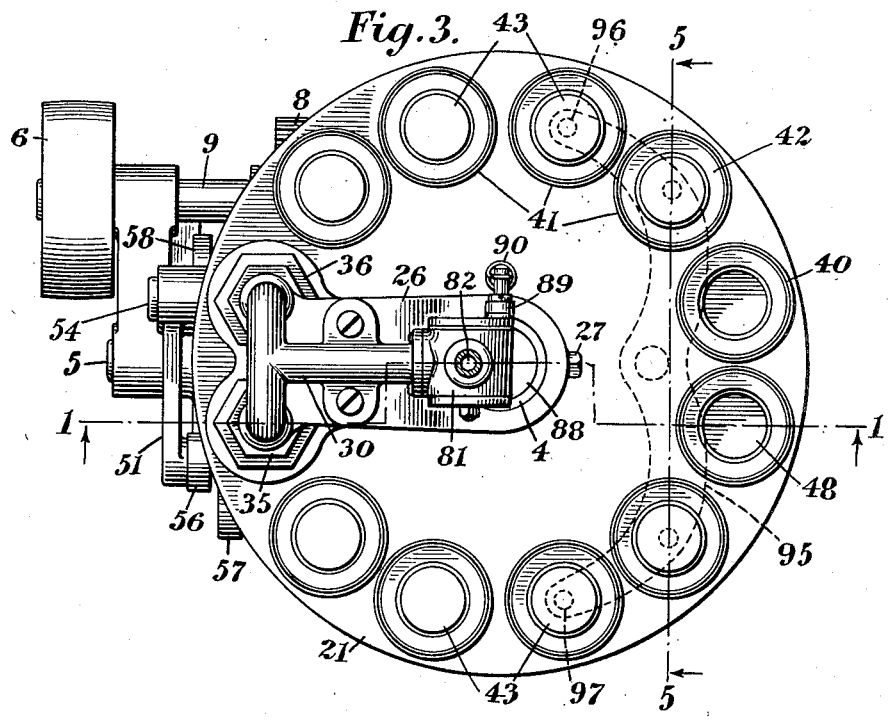
Figure 3 is a plan view looking directly down on top of the machine.
Figure 4:
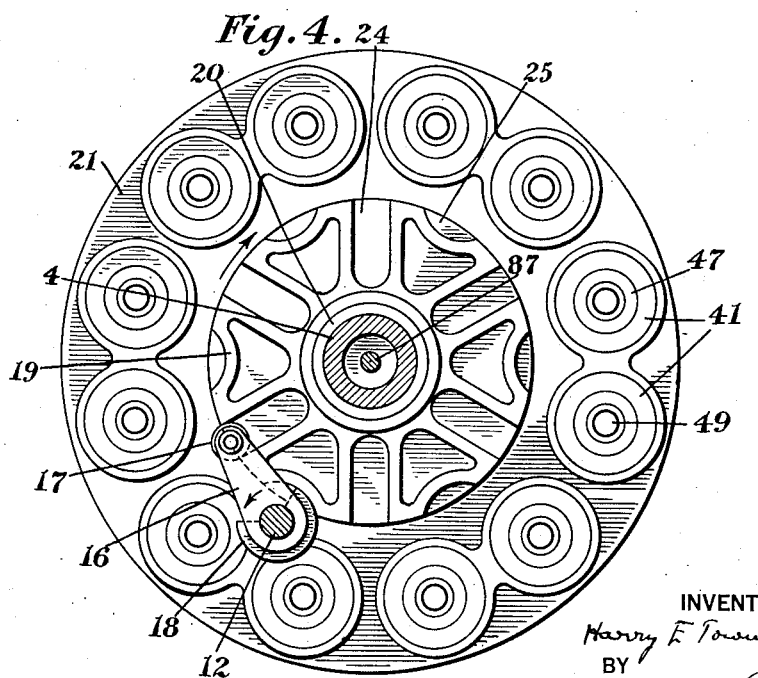
Figure 4 is a view of the bottom of the pocket table and operating mechanism to turn the table.

Referring now to the drawings and more particularly to Figures 1 and 2, the machine frame is provided with a base 1 from which extends a vertical pedestal 2 that is machined on its upper end to form a stationary shaft 4. The base carries the main drive shaft 5 which may be provided with a suitable drive wheel 6 and carries a gear 7 that meshes with the gear 8 which drives a counter shaft 9 to which is secured the beveled gear 10. This beveled gear 10 meshes with a corresponding beveled gear 11 that is mounted upon the lower end of the table drive shaft 12. This table drive shaft 12 extends vertically and is mounted in bearings 14 and 15 that extend from the vertical pedestal 2. The upper end of the drive shaft 12 (Fig. 4) carries a crank arm 16 on the end of which is the drive roll 17 and the stop cylinder 18. A cam 19 of the Geneva type is secured to an extension 20 on the pocket table 21 which is mounted to rotate on the stationary shaft 4 and is supported on the shoulder 22. The Geneva cam 19 is provided with six roller pockets 24 that subtend angles of 60°, and intermediate the roller pockets are holding pockets 25. When the table drive shaft 12 is rotated the drive roll 17 engages the roller pockets 24 and as the shaft 12 continues rotation the receptacle pocket table 21 is turned through 60°. Prior to the roll 17 leaving its respective roller pocket, the stop cylinder 18 has turned into engagement with a holding pocket 25 and the receptacle pocket table 21 is locked against further movement until the drive roll 17 enters the next adjacent roller pocket 24. A head frame 26 is rigidly mounted on the upper end of the stationary shaft 4 by means of plug bolts 27 which pass through the sleeve in the head frame 26 and into the stationary shaft 4. This head frame 26 serves as an abutment limiting the upward movement of the receptacle pocket table 21. This head frame 26 extends sidewise from the vertical shaft 4 and overhangs a portion of the receptacle pocket table 21. This overhanging part of the head frame carries a pair of sealing dies 28 which are hollow and threaded, as at 29, into a T-pipe 30. The sealing dies are shouldered, as at 31, whereby the said dies are capable of withstanding endwise pressure necessary for the sealing operation, which will be hereinafter described. Each sealing die is surrounded by a sleeve 32 that terminates in its lower end in a receptacle cover 34. The sleeve 32 is provided with a packing gland 35 whereby an air-tight joint may be formed between the said sleeve 32 and the stem of the sealing die 28. The sleeve 32 is also screw threaded and provided with a pair of lock nuts 36 whereby the sliding movement of the sleeve 32 may be limited or eliminated. Springs 37 normally retain the lower lock nut 36 in contact with the shelf 38 of the head frame 26. The receptacle cover 34 is provided with a gasket 39 with which the upper edge 40 of the sealing pocket 41 is adapted to contact and form a hermetic joint. The receptacle pocket table 21 is illustrated as carrying twelve pockets, each of which is provided with a sealing ring chuck 42 that is screw threaded into the upper end of the pocket and adapted to cooperate with the bead 44 on the sealing die to deform the head 45 on the sealing cap to effect a suitable side seal against the receptacle 46 (Figs. 9 and 10). Each sealing pocket 41 is slidable vertically within the pocket table 21 and is provided on its lower portion with a gasket 47. A receptacle support or base 48 is slidably mounted in each sealing pocket and is provided with an extension 49 extending through an opening in the bottom of the sealing pocket 41. These receptacle bases 48 may be changed so that receptacles of different height may be sealed by the machine. Furthermore, it is desirable in a machine of this character to have the least possible air space around the receptacle being sealed, and these bases 48 fill up space that otherwise would be filled with air. Directly beneath the shelf 38 on the head frame 26 is provided a pair of sealing plungers which comprise bell crank levers 50 and 51 that are pivoted on stub shafts 52 and 54 that are rigidly mounted on the pedestal 2. These bell crank levers 50 and 51 carry anti-friction rolls 55 and 56 which engage operating cams 57 and 58 that are fixedly mounted on the main drive shaft 5. The bell cranks 50 and 51 are connected at their other ends with toggle links 59 and 60 which are operatively connected with plungers 61 and 62 that carry collars 64 and 65 which support heavy coiled springs 66 and 67 that in turn support pocket raisers 68 and 69. These pocket raisers are provided with beads 70 and 71 that bite into the gaskets 47 to form a hermetic seal with the bottom of the sealing gaskets 41. In order that the heavy coiled springs 66 and 67 may be under suitable tension the plungers 61 and 62 are slotted, as at 72 and 74, and cross pins 75 and 76 carried by the pocket raisers 68 and 69 extend through the said slots. The lifter posts 77 and 78 are mounted within the pocket raisers 68 and 69 and are supported upon relatively light coiled springs 79 and 80 and engage the extensions 49 on the receptacles' bases prior to the pocket raisers' engaging the bases of the pockets. This operation lifts the receptacles to be sealed slightly in advance of the pockets and lightly maintains the sealing caps against the sealing dies, which prevents displacement of the caps during the sealing operation. As the main drive shaft rotates it is obvious that the action of the bell cranks, the toggle links, the plungers, and connected mechanisms, is to raise the sealing pockets 41 and the receptacles 46 with caps 43, thereon, into engagement with the sealing dies. A continued upward movement of the pockets 41 clamps the bead 45 between the chuck ring 42 and the bead 44 on the die so that further movement deforms the bead 45 and makes the hermetic seal desired on the receptacle. Prior to this sealing operation it is desirable to exhaust the air from the receptacle being sealed. To this purpose the T-pipe 30 is connected with an air control valve 81 which is provided with one port 82 connected with a suitable exhaust pump (not shown) and another port 84 open to atmosphere. This air valve 81 is operated by a cam 85 also carried on the main shaft 5 and this cam cooperates with an anti-friction roll 86 on a plunger rod 87 which extends vertically through an opening in the vertical pedestal 2. The upper end of the plunger rod 87 carries a guide cylinder 88 that slides in a suitable guideway in the extreme upper end of the hollow shaft 4. A link 89 is connected with the upper end of the plunger rod 87 and to the air control valve 81, and the coil spring 90 normally maintains the anti-friction roll 86 at all times engaged with the cam 85. The cam 85 is also so timed relatively to the operating cams 57 and 58 for the sealing mechanism that the air valve 81 is moved to uncover the port 82 immediately after pockets 41 have been brought into close engagement with the receptacle covers 34, and before the sealing operation is begun. This position of the air valve permits the exhaustion of the now closed sealing pockets and thereby withdraws the air from within the food receptacles in said pockets. The air valve 81 is maintained in this position until the sealing operation is completed, at which time further rotation of the drive shaft drops the sealing plungers and also the plunger rod 87 for the air valve 81, whereby this valve is turned to close the port 82 and open the port 84 which permits atmospheric air to break the vacuum in the exhausted sealing pockets, which thereupon drop away from the sealing dies.

During these operations the cam 91, also on the main drive shaft, has operated to lift the plunger rod 92 through the medium of the anti-friction roll 94, which lifts the ejector plate 95 that carries two pairs of posts 96 and 97. These lifted posts are positioned to engage the extensions 49 on the two receptacle bases 48 at each side of the sealing head, so that when the ejector plate 95 is raised those four receptacle bases 48 are lifted. The coil spring 98 maintains the anti-friction roll 94 against the cam 91. Assuming the machine to be running full: The cam 91 is timed so that during the sealing and exhausting operations the lifted posts 96 and 97 are at the limit of their upward movement, whereby the receptacle bases 48 associated with the posts 96 are raised to such position as to permit the operator to place a pair of unsealed receptacles into the pockets, while the receptacle bases associated with lifted posts 97 on the other side of the sealing head have been raised to position a pair of sealed receptacles to enable the operator to withdraw them from the machine. By this arrangement it is to be noted that the parts are adapted to position receptacles for sealing, seal receptacles, and position receptacles for removal, as simultaneous operations, and that said operations are performed successively upon each receptacle.

From the foregoing description will be obvious certain novel and advantageous characteristics of this device. In the first place, it is to be observed that the several operations are performed upon the packages in pairs; that is, a pair of juxtaposed receptacles are positioned for the reception of the packages simultaneously, the pair of receptacles which have thus received packages are then moved together to the exhausting and sealing operations, and the same pair of receptacles are then operated to position their contained packages for removal. This performance of the successive operations on the packages in pairs permits the operator to utilize both hands in the loading and unloading operations, handling the two associated packages simultaneously. By providing sealing heads associated with diametrically opposed pairs of pockets, and lifting mechanism for the pockets intermediate the sealing heads so arranged, two operators, working on opposite sides of the machines, may each remove a pair of sealed containers from the pockets at his right with one motion, and place unsealed packages in the pair of pockets at his left with another motion. By thus associating the package handling receptacles in groups for the several operations, the capacity of the machine is increased without increasing the necessary labor.

Realizing that my invention may be carried out in physical embodiments other than the specific structures herewith disclosed, I desire that such disclosures herewith be understood as illustrative and not in the limiting sense.

Having thus described my invention what I claim is:

1. In a sealing machine, the combination of a rotary carrier, said carrier being provided with pockets arranged in pairs for the reception of packages, a sealing device effective simultaneously upon packages in a pair of pockets, positioning mechanisms arranged for association with pockets ahead of and behind the sealing device and effective to move packages in a pair of pockets simultaneously, and means cooperating with the carrier for presenting the respective pairs of pockets to the operation of the sealing device and the positioning mechanisms successively.

2. In a sealing machine, the combination of a rotary carrier, said carrier being provided with pockets arranged in pairs for the reception of packages, an exhausting mechanism effective simultaneously upon packages in a pair of pockets, positioning mechanisms arranged for association with pockets ahead of and behind the exhausting mechanism and effective to move packages in a pair of pockets simultaneously, and means cooperating with the carrier for successively presenting the pairs of pockets severally to the operation of the exhausting mechanism and the positioning mechanisms.

3. In a sealing machine, the combination of a rotary carrier, said carrier being provided with pockets arranged in groups for the reception of packages, a sealing device effective simultaneously upon packages in a group of pockets, positioning mechanism arranged for association with groups of pockets ahead of and behind the sealing device and effective to move packages in a group of pockets simultaneously, and means cooperating with the carrier for successively presenting the respective groups of pockets to the operation of the sealing device, and the positioning mechanism.

4. In a sealing machine, the combination of a rotary carrier, said carrier being provided with pockets arranged in groups for the reception of packages, exhausting mechanism effective simultaneously upon packages in a group of pockets, positioning mechanism arranged for association with pockets ahead of and behind the exhausting mechanism and effective to move packages in a group of pockets simultaneously, and means cooperating with the carrier for successively presenting the groups of pockets to the operation of the exhausting mechanism and the positioning mechanism.

5. In a sealing machine, the combination of a rotary carrier, said carrier being provided with pockets arranged for the reception of packages, a sealing device arranged for association with the pockets, positioning mechanism effective to move packages in the pockets ahead of and behind the sealing device, means for moving the carrier intermittently to present the pockets to the operation of the sealing device and positioning mechanism successively, and means rendering the sealing device and the positioning mechanism effective upon packages in respective pockets during the periods when the carrier is at rest.

6. In a sealing machine, the combination of a rotary carrier, said carrier being provided with pockets arranged in pairs for the reception of packages, a sealing device arranged for cooperation simultaneously with a pair of pockets, positioning mechanism arranged for cooperation with pairs of pockets ahead of and behind the sealing device, and means associated with the carrier for presenting respective pairs of pockets to the operation of the sealing device and the positioning mechanism successively.

7. In a sealing machine, the combination of a rotary carrier, said carrier being provided with pockets arranged in pairs for the reception of packages, a sealing device arranged for cooperation simultaneously with a pair of pockets, positioning mechanism arranged to handle packages in pairs of pockets before and after their presentation to the sealing device, means associated with the carrier for successively presenting the pairs of pockets to the operation of the sealing device and the positioning mechanism and means rendering the sealing device and the positioning mechanism effective concomitantly upon packages in the respective pairs of pockets.

8. In a sealing machine, the combination of a rotary carrier, said carrier being provided with pockets for the reception of packages, a sealing device arranged for cooperation with packages in the pockets, a positioning device ahead of the sealing device for positioning packages in the pockets, an ejecting device for moving packages out of the pockets, means cooperating with the carrier to move the packages into operative association with the positioning device, sealing device, and ejecting device successively, and means for rendering said devices effective concomitantly upon packages in different pockets.

9. In a sealing machine, the combination of a movable carrier, receptacles carried thereby for the reception of packages, a sealing mechanism arranged for cooperation with said receptacles to seal packages carried thereby, positioning means ahead of the sealing mechanism for cooperation with said receptacles to position them for reception of packages, ejecting means for cooperation with the receptacles to present packages for removal subsequent to the sealing operation, and means for operating the carrier to present the receptacle successively to the operations of said positioning means, sealing mechanism, and ejecting means.

10. In a sealing machine, the combination of a movable carrier, receptacles carried thereby for the reception of packages, a sealing device arranged for cooperation with packages carried in said receptacles, means for operating the carrier to present the receptacle successively to the operation of the sealing device, and means for concomitantly positioning receptacles on the carrier prior to and subsequent to their presentation to the sealing device.

11. In a sealing machine, in combination, a movable carrier having a plurality of pockets arranged in pairs for the reception of packages, sealing devices for sealing packages in a pair of the pockets on said carrier, positioning means effective to position packages in pairs of pockets ahead of and behind the sealing devices, means for operating said carrier to present the respective pairs of pockets to the positioning means sealing devices successively.

12. In a machine of the character described, in combination, a sealing head, a table having a rotary movement relative to said sealing head, receptacles arranged in pairs on said table, means cooperating with the sealing head for sealing packages within a pair of said receptacles simultaneously, and mechanism for positioning pairs of said receptacles on the table ahead of and behind the sealing head concomitantly with the sealing operation.

13. In a machine of the character described, in combination, a machine frame, a table rotatably mounted upon said frame, receptacles arranged in groups carried by said table, a sealing head to which the respective groups of said receptacles are presented successively by movement of the table, means for rendering the sealing head effective to seal packages in the group of receptacles presented thereto, devices on one side of said sealing head for positioning receptacles comprising a group presented thereto by the table, and devices on the other side of said sealing head for simultaneously moving packages out of the receptacles comprising a group presented thereto by the table.

14. In a machine of the character described, the combination of a plurality of receptacles adapted to support packages, sealing mechanism for sealing packages supported in the receptacles, means for rendering said sealing mechanism effective upon packages in different receptacles successively, means cooperating with said receptacles in advance of said sealing mechanism to position them for the reception of packages, and means cooperating with receptacles sequentially to the sealing mechanism to position them for removal of packages.

15. In a sealing machine, in combination, a movable carrier, supports on said carrier for retaining packages, means for moving said carrier intermittently with rest intervals between the periods of movement, sealing devices disposed for cooperation with packages on certain of said supports, means for actuating said sealing devices to render them effective upon a plurality of packages on said supports during rest intervals of the carrier, positioning means arranged for cooperation with the supports on said carrier, and means for rendering said positioning means effective upon the supports on opposite sides of the sealing devices during the rest intervals of the carrier.

16. In a sealing machine, in combination, a movable carrier, receptacles movably mounted thereon and adapted for the reception of packages, a closure for said receptacles to which the receptacles are presented successively by movement of the carrier, said closure being movable with the receptacles relative to the carrier, and means for exhausting the air from the receptacles while in cooperation with the closure.

17. In a sealing machine, in combination, a movable carrier, receptacles mounted thereon for the reception of packages, sealing devices supported by the receptacles for cooperation with the carried packages, a sealing device to which the receptacles are presented by movement of the carrier, said sealing device being adapted to cooperate with the several sealing devices on the receptacles individually, a yieldably supported closure adapted for cooperation with the receptacles individually and rendered effective on receptacles by their movement relative to the carrier, and means for exhausting the receptacles while in cooperation with the closure.

18. In a sealing machine, in combination, a rotatable carrier, a plurality of receptacles carried thereby and movable thereon substantially parallel to the axis thereof, a closure arranged for cooperation with said receptacles individually, said closure being movable with receptacles in their movement on the carrier, and means for exhausting the receptacles while associated with the closure.

19. In a machine of the character described in combination, a receptacle for a package, a sealing device carried thereby for operation on a package therein, a closure for said receptacle, a sealing member within said closure arranged for cooperation with said first mentioned sealing member, said closure being movable relative to the sealing member therein, means for moving the receptacle into operative association with the closure and relative to the sealing member therein, and means for exhausting the receptacle while in cooperation with the closure.

HARRY E. TOWNSEND.